(12) United States Patent
Hand et al.

(10) Patent No.: US 10,790,682 B2
(45) Date of Patent: Sep. 29, 2020

(54) HYBRID POWER BOOST CHARGING WITH PEAK POWER PROTECTION

(71) Applicant: INTEL CORPORATION, Santa Clara, CA (US)

(72) Inventors: Teal Hand, Beaverton, OR (US); Alexander B. Uan-Zo-li, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 41 days.

(21) Appl. No.: 15/942,395

(22) Filed: Mar. 30, 2018

(65) Prior Publication Data

US 2019/0305568 A1  Oct. 3, 2019

(51) Int. Cl.
*H02J 7/00* (2006.01)

(52) U.S. Cl.
CPC ............ *H02J 7/0026* (2013.01); *H02J 7/007* (2013.01); *H02J 2207/10* (2020.01)

(58) Field of Classification Search
CPC ............... H02J 7/0031; H02J 2007/004; H02J 2007/0037; Y02E 60/12; H01M 10/48
See application file for complete search history.

(56) References Cited

U.S. PATENT DOCUMENTS

| | | | |
|---|---|---|---|
| 5,859,481 A * | 1/1999 | Banyas | H02J 7/0024 307/130 |
| 6,177,779 B1 * | 1/2001 | Eguchi | G06F 1/263 320/116 |
| 6,271,605 B1 | 8/2001 | Carkner et al. | |
| 8,456,442 B2 | 6/2013 | Kao et al. | |
| 9,395,774 B2 | 7/2016 | Rotem et al. | |
| 9,568,966 B2 | 2/2017 | Berke et al. | |
| 2003/0084358 A1 | 5/2003 | Bresniker et al. | |
| 2004/0268166 A1 | 12/2004 | Farkas et al. | |
| 2008/0197707 A1 | 8/2008 | Chi Yang | |
| 2009/0001935 A1 * | 1/2009 | Odaohhara | H02J 7/0031 320/134 |
| 2009/0206657 A1 | 8/2009 | Vuk et al. | |
| 2009/0326724 A1 | 12/2009 | Lasseter et al. | |
| 2011/0244929 A1 | 10/2011 | Dror | |
| 2012/0091813 A1 | 4/2012 | Spurlin et al. | |
| 2012/0139345 A1 | 6/2012 | Ye et al. | |
| 2012/0198249 A1 | 8/2012 | Benhase et al. | |
| 2013/0111410 A1 | 5/2013 | Okada et al. | |
| 2013/0124885 A1 | 5/2013 | Davis et al. | |

(Continued)

FOREIGN PATENT DOCUMENTS

| KR | 10-2013-011811 A | 1/2013 |
|---|---|---|
| WO | 2018175030 A1 | 9/2018 |

OTHER PUBLICATIONS

International Search Report for related Application PCT/2018/019043 filed Feb. 21, 2018 dated May 24, 2018, 4 pages.

(Continued)

*Primary Examiner* — Arun C Williams
(74) *Attorney, Agent, or Firm* — International IP Law Group, P.L.L.C.

(57) ABSTRACT

In some examples, a hybrid power boost peak power protection system includes an energy storage, a hybrid power boost charger to charge a battery, and a switch to couple a system load to the energy storage and to decouple the system load from the energy storage.

31 Claims, 9 Drawing Sheets

(56) References Cited

U.S. PATENT DOCUMENTS

| | | |
|---|---|---|
| 2013/0169038 A1* | 7/2013 | King .................. B60L 58/18 |
| | | 307/10.1 |
| 2014/0067139 A1 | 3/2014 | Berke et al. |
| 2014/0092106 A1 | 4/2014 | Hurd et al. |
| 2014/0095897 A1 | 4/2014 | Uan-Zo-Li et al. |
| 2014/0098525 A1* | 4/2014 | Bennett ................ H02J 7/0052 |
| | | 362/183 |
| 2014/0355308 A1 | 12/2014 | Uan-Zo-Li et al. |
| 2014/0380072 A1 | 12/2014 | Lee |
| 2015/0177811 A1 | 6/2015 | Bose et al. |
| 2015/0180249 A1* | 6/2015 | Jeon .................... H02J 7/025 |
| | | 320/108 |
| 2015/0340897 A1 | 11/2015 | Uan-Zo-Li et al. |
| 2016/0065052 A1 | 3/2016 | Shinozaki et al. |
| 2016/0091950 A1 | 3/2016 | Thompson et al. |
| 2016/0179164 A1 | 6/2016 | Park et al. |
| 2016/0306014 A1 | 10/2016 | Jeon |
| 2016/0332532 A1 | 11/2016 | Ro |
| 2017/0293332 A1 | 10/2017 | Rotem et al. |

OTHER PUBLICATIONS

International Search Report and Written Opinion for PCT Application No. PCT/US2017/016732, dated May 17, 2017, 15 pages.
International Search Report for related PCT Application Serial No. PCT/US2019/020036 with a completion and dated Jun. 13, 2019, 3 pages.

* cited by examiner

100

800

HYBRID POWER BOOST CHARGING WITH PEAK POWER PROTECTION

RELATED APPLICATIONS

This application is related to U.S. patent application Ser. No. 15/477,046 filed on Apr. 1, 2017 and entitled "Power Management And Protection". This application is also related to U.S. patent application Ser. No. 15/466,498 filed on Mar. 22, 2017 and entitled "Mechanism To Extend The Peak Power Capability Of a Mobile Platform".

TECHNICAL FIELD

This disclosure relates generally to hybrid power boost (HPB) charging with peak power protection.

BACKGROUND

The mobile computing industry is continually moving toward smaller form factors, while at the same time the SoC (System On Chip) is consuming more power, bringing intense thermal cooling complexity. The peak power requirement for the SoC is increasing almost exponentially along with the rising peak power of the rest of the system.

Many computing systems (for example, portable mobile systems or client systems) need to maintain a system voltage above a certain level (for example, above a $V_{min}$ level). For example, in some mobile systems a minimum system voltage power management integrated circuit (PMIC) $V_{min}$ can be 2.5 volts (2.5V). In some client systems a minimum system voltage regulator (VR) or PMIC voltage $V_{min}$ can be 5.6V, for example. Every computing system will have some resistance between system battery cells and system VR. This resistance and voltage droop can limit peak platform power, particularly in situations where the battery is not fully charged.

BRIEF DESCRIPTION OF THE DRAWINGS

The following detailed description may be better understood by referencing the accompanying drawings, which contain specific examples of numerous features of the disclosed subject matter.

In some cases, the same numbers are used throughout the disclosure and the figures to reference like components and features. In some cases, numbers in the 100 series refer to features originally found in FIG. 1; numbers in the 200 series refer to features originally found in FIG. 2; and so on.

DESCRIPTION OF THE EMBODIMENTS

Figure 1:
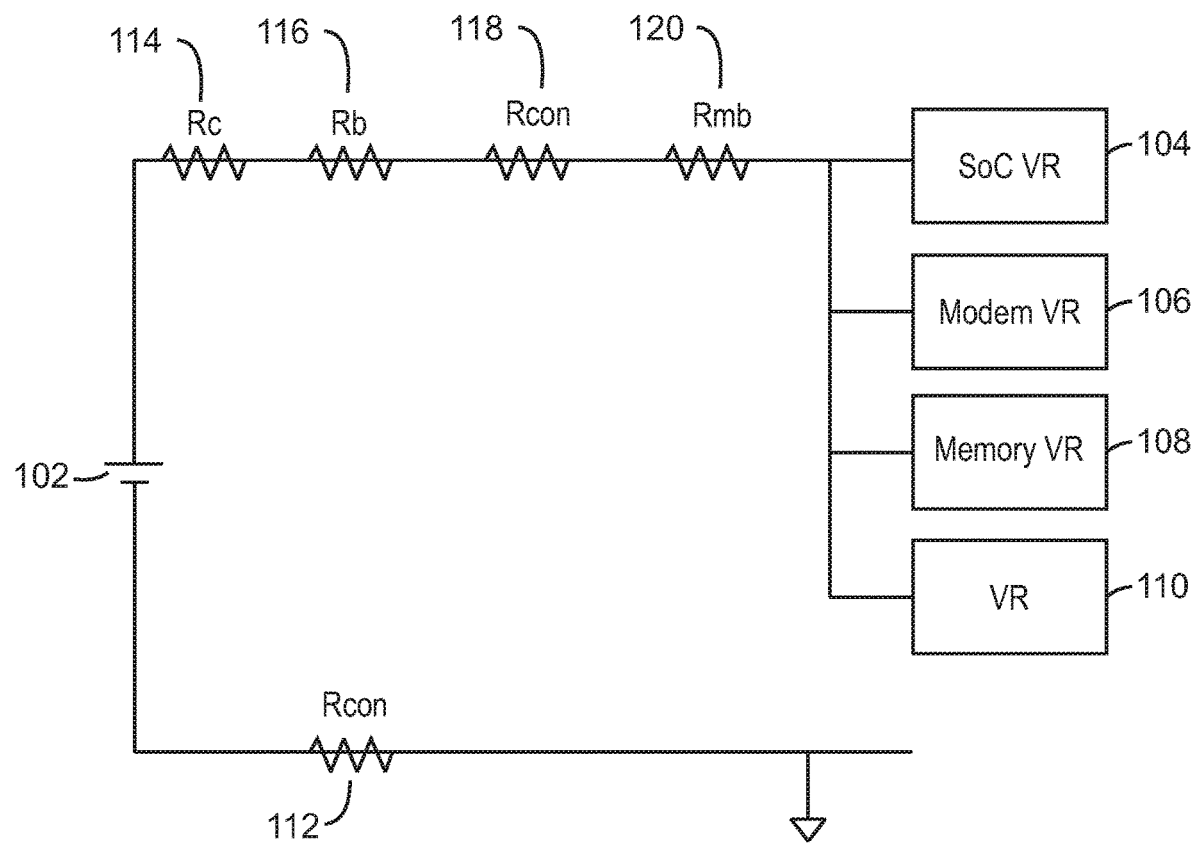
FIG. 1 illustrates a computing system example.

Some embodiments relate to hybrid power boost (HPB) charging with peak power protection (or maximum power protection).

Some embodiments relate to power management. Some embodiments relate to power generation. Some embodiments relate to voltage generation. Some embodiments relate to power protection. Some embodiments relate to voltage protection. Some embodiments relate to minimum operating voltage (Vmin) active protection (VAP). Some embodiments relate to HPB charging with VAP (for example, a mobile system with HPB charging and VAP).

As discussed above, many computing systems (for example, portable mobile systems or client systems) need to maintain a system voltage above a certain level (for example, above a $V_{min}$ level). Failure to maintain a system voltage above Vmin can result in a system shutdown. For example, in some mobile systems a minimum system voltage power management integrated circuit (PMIC) $V_{min}$ can be 2.5 volts (2.5V). In some client systems, a minimum system voltage regulator (VR) or PMIC voltage $V_{min}$ can be 5.6V, for example. Every computing system will have some resistance between system battery cells and system VR. This resistance and voltage droop can limit peak platform power, particularly in situations where the battery is not fully charged. The resistance results in large system voltage droops during large power or current draws. The resulting voltage droop below a minimum voltage (Vmin) can increase as voltage of the battery reduces due to a state of charge. Since risk to shutdown is not typically acceptable, the battery or adapter sizes must be increased to accept a worst case expected current, and resulting voltage droop of the system creates a situation where peak power must be limited to allow for smaller batteries and adpators.

As the industry moves toward using Universal Serial Bus (USB) Type C Power Delivery (PD), the power vs. thermal constrain sees even more complexity. For example, the USB-C PD specification with Thunderbolt support includes power sourcing requirements including that at least one connector for small designs will be required to have the ability to provide 15 Watts of power to an attached device. A simple mouse connected to the Type C Thunderbolt port might be recognized as a passive load requiring a lot of power. This could force the peak power limit of the SoC lower in order to maintain system functionality due to the power vs. thermal constraint and the crossing of the minimum system voltage (Vsys_min).

Many systems are now being used with 2S batteries (that is, batteries that are built with two cells in series with a possibility of two more batteries added in parallel). This configuration is popular due to lower voltage regulator (VR) size and power loss, which can be accomplished with higher switching frequency. Higher voltage configurations (for example, 3S or 4S configurations) are typically reserved for larger systems. 1S and 2S systems maintain a lower system voltage than 3S or 4S systems, limiting the time and energy delta for the platform to maintain peak power before dropping below an operational voltage range (Vsys_min). Systems such as 1S and 2S systems in particular can become complex in higher peak power requirement implementations. For example, in some implementations, voltage limitations with a 1S system can be around 2.5V and with a 2S system can be around 5.4V. These limitations can be driven by a 5V regulator minimum voltage (5.4V for a 2S system) and a PMIC minimum voltage (for example, 2.5V for a 1S system and 5.4V for a 2S system).

In addition to the above concerns, with the possibility of a power jump during SoC turbo mode being accompanied by a power burst from the rest of the platform, total system voltage (Vsys_min) my drop below the minimum allowed system voltage and force the system to black-screen, for example. In order to avoid this possibility, systems may be set up to limit peak frequency in multi-threaded operation, for example, which can in some circumstances negatively affect system performance. Additionally, when a device such as a mobile computing device is connected to a USB-C Thunderbolt enabled port, the peak Central Processing Unit (CPU) performance may be constrained even further.

FIG. 1 illustrates a computing system example 100 showing exemplary resistance between one or more battery cells 102 and system voltage regulation (VR), such as, for example, a system on chip (SoC) voltage regulator 104, a modem voltage regulator 106, a memory voltage regulator 108, or one or more other system voltage regulator 110. The resistance between battery cell(s) and system voltage regulator(s) can include, for example, battery cell, battery connector and sense resistor(s), pass field effect transistor(s), or power delivery traces on the motherboard. Such example resistances are illustrated by $R_{con}$ 112 (battery connector resistance), $R_c$ 114 (resistance of a battery cell or resistance of an external power supply such as a brick, charger or power supply unit), $R_b$ 116 (battery enclosure resistance), $R_{con}$ 118 (connector resistance), or $R_{mb}$ 120 (motherboard resistance, such as, for example field effect transistors, power train, etc.), for example. An amount of such resistances can depend on factors including, for example, battery configuration (for example, a number of battery cells in series vs. a number of battery cells in parallel), the quality and design of components, wear, temperature, or load step, etc. In some mobile or client systems, an amount of system resistance can be in a range between 100 mOhm and 200 mOhm, for example. In some mobile or client systems, an amount of system resistance can be in a range between 50 mOhm and 185 mOhm, for example. In some mobile or client systems, an amount of system resistance can be in a range between 110 mOhm and 180 mOhm, for example.

FIG. 1 can be viewed as a conceptual figure illustrating the concept that in a computing system, between the battery through the board to the system voltage regulators there is a certain amount of resistance, and there is a voltage drop across this resistance. In today's computing systems, there is a limit as to how much current or total system power may be consumed, and a concern that the minimum voltage of the system should not be violated. A resistance between one or more battery cells and one or more voltage regulator(s) in a computing system can create a voltage droop (I*R) that can limit peak platform power (particularly if the battery is not fully charged).

Figure 2:
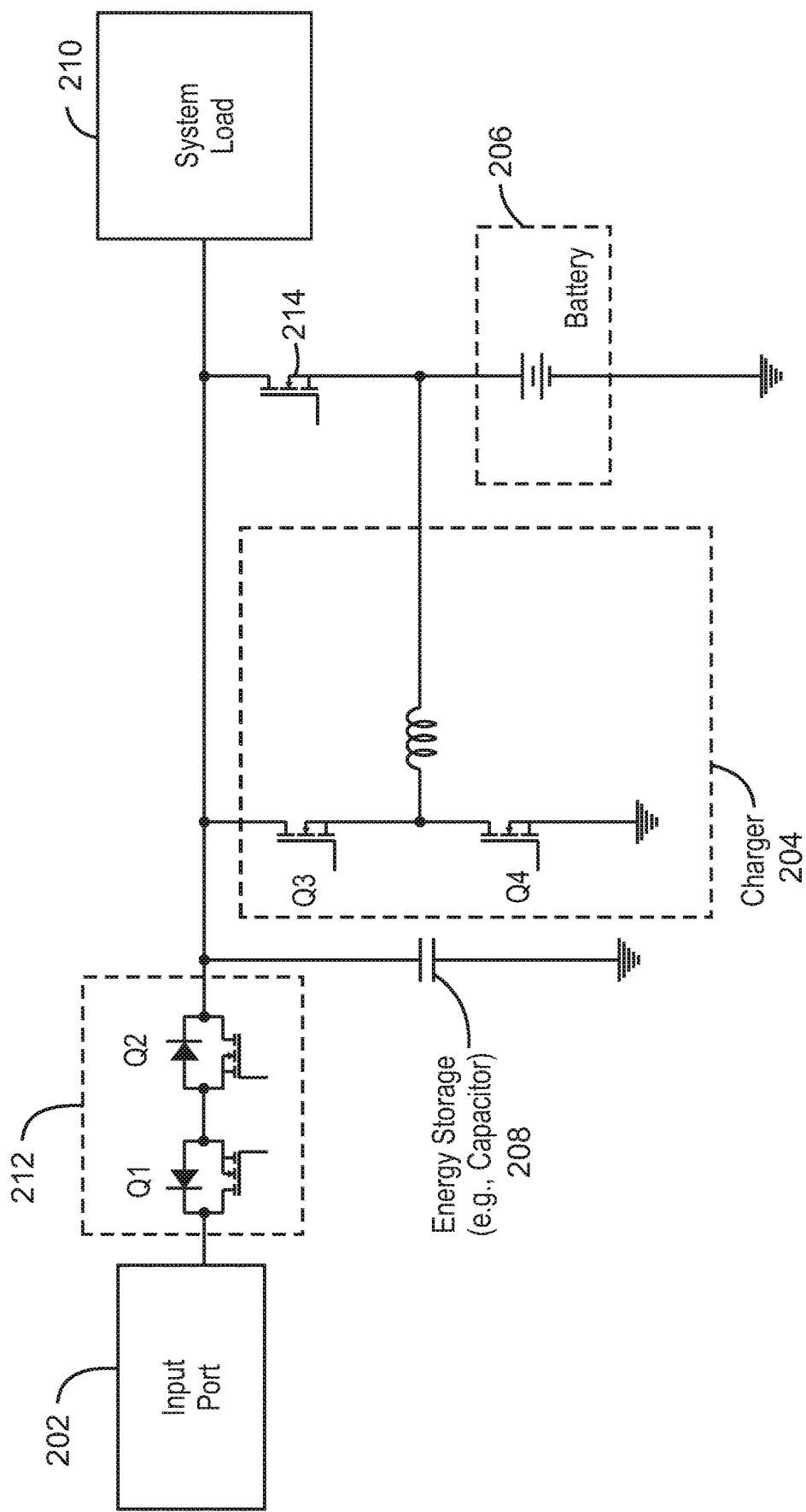
FIG. 2 illustrates a charging system.

FIG. 2 illustrates a system 200 in accordance with some embodiments. In some embodiments, system 200 is a power supply system (for example, a mobile power supply system). System 200 includes an input port 202 (for example, a USB type C connector, USB-C PD, and/or USB-C Thunderbolt enabled port), a charger 204 (for example, a Hybrid Power Boost charger or HPB charger, or a hybrid boost converter or HPB converter), a battery 206, an energy storage 208 (for example, a capacitor), a system load 210, a switch 212 (for example, using two power field effect transistors or power FETs, or pass FETs, Q1 and Q2), and a switch 214 (for example, using a power field effect transistor or power FET, or pass FET). In some embodiments, charger 204 can include two power field effect transistors or power FETs, or pass FETs, Q3 and Q4 and an inductor. In some embodiments, although the FETs Q3 and Q4 within charger 204 and FET 214 are illustrated differently than FETs Q1 and Q2 of switch 212, it is noted that in some embodiments, all FETs illustrated in FIG. 2 are the same. That is, in some embodiments all FETs in FIG. 2 can be illustrated as FETs Q1 and Q2 are illustrated, and in some embodiments, all FETs in FIG. 2 can be illustrated as FETs Q3, Q4, and FET 214 are illustrated.

In some embodiments, system 200 is a hybrid power boost (HPB) charging system, and charger 204 is an HPB charger. Charger 204 can provide power to system load 210, and can charge the battery 206 when an adapter is connected at the input port 202. As illustrated in FIG. 2, a hybrid power boost (HPB) configured battery charger such as charger 204 can separate the system power rail and the battery. In system 200, the system power rail is directly connected to the power input (with two switches for protection).

In some embodiments, system load 210 is a mobile computing system, such as, for example, a smartphone, tablet, laptop computer, etc., among others. System load 210 can include a processor, a memory, one or more communication devices, etc., as well as other computing device components that make up the rest of the platform and are powered by rechargeable battery 206 and can also be powered from an external power source (not shown in FIG. 2). In some embodiments, battery 206 can provide power to system load 210 when an external power source is not available. In some embodiments, battery 206 is a lithium-ion battery pack. In some embodiments, other rechargeable or non-rechargeable batteries may be used.

In some embodiments, energy storage 208 can supplement the voltage provided by battery 206 to system load 210. For example, energy storage 208 can include one or more components for input decoupling of the charger 204 in the form of one or more capacitors coupled together (for example, in series). For example, energy storage 208 can be implemented by one or more individual capacitors coupled together in parallel or in series.

Depending on the battery configuration, resistance from the cells to the voltage regulator (VR) input can vary (for example, in some embodiments, from 110 mOhm to 185 mOhm). The resistance can also change based on temperature, battery wear, and variation between components. A change from 110 mOhm to 185 mOhm can result in a considerable difference in peak power that the system can support. Many systems use 2S1P (2 series 1 parallel) and 2S2P (2 series 2 parallel) battery configurations, but some system manufacturers may be reluctant to use a 2S2P battery configuration due to more system complexity and less efficient usage of the battery space, as well as higher cost.

Figure 3:
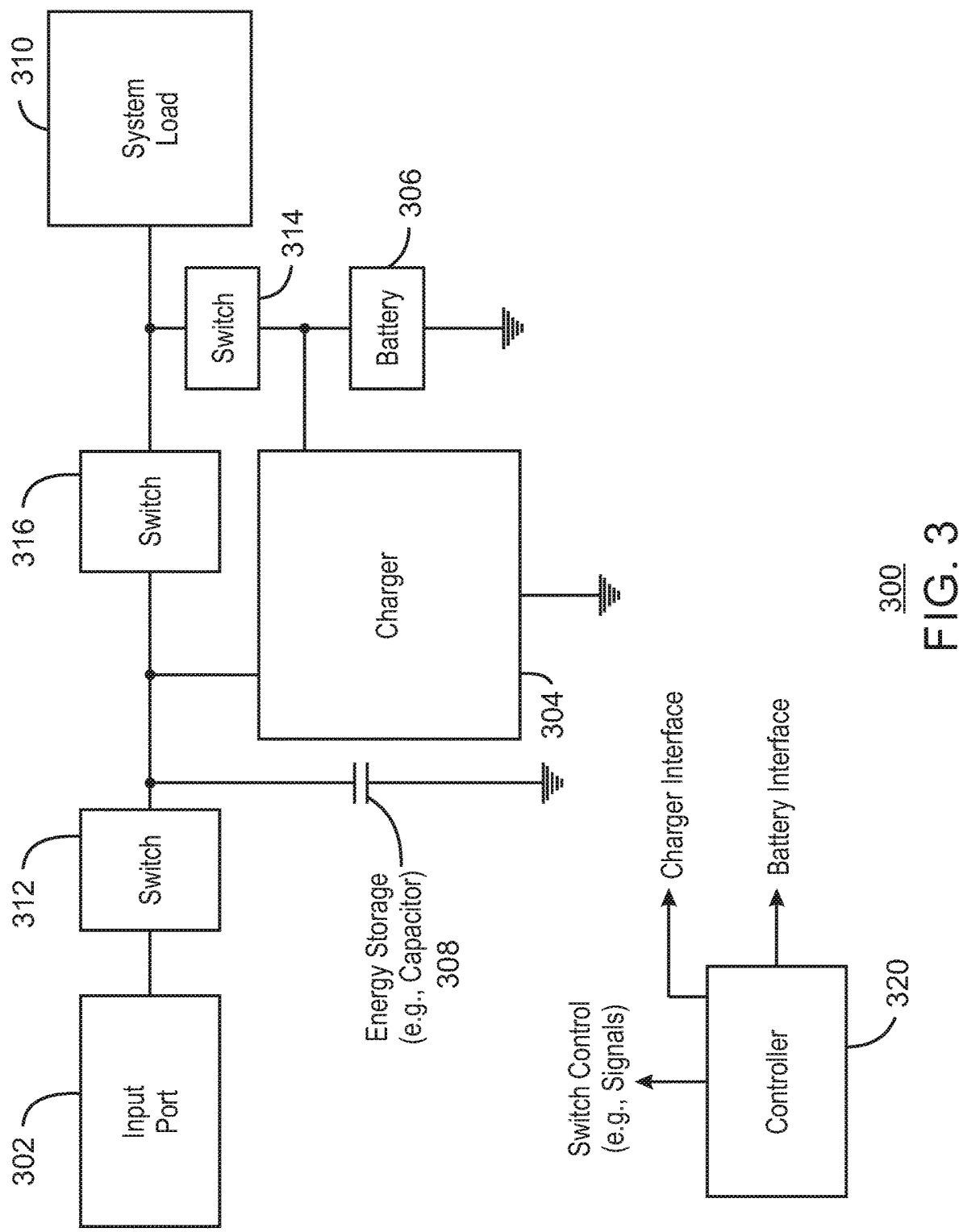
FIG. 3 illustrates a charging system.

FIG. 3 illustrates a system 300 in accordance with some embodiments. In some embodiments, system 300 is a power supply system (for example, a mobile power supply system). System 300 includes an input port 302 (for example, a USB type C connector, USB-C PD, and/or USB-C Thunderbolt enabled port), a charger 304 (for example, a Hybrid Power Boost charger or HPB charger, or a hybrid boost converter or HPB converter), a battery 306, an energy storage 308 (for example, a capacitor), a system load 310, a switch 312 (for example, using one or more power field effect transistors or power FETs, or pass FETs), a switch 314 (for example, using a power field effect transistor or power FET, or pass FET), a switch 316 (for example, using a power field effect transistor or power FET, or pass FET), and a controller 320. In some embodiments, charger 304 can include two power field effect transistors or power FETs (or pass FETs) and an inductor.

In some embodiments, system 300 is a hybrid power boost (HPB) charging system, and charger 304 is an HPB charger. Charger 304 can provide power to system load 310, and can charge the battery 306 when an adapter is connected at the input port 302. As illustrated in FIG. 3, a hybrid power boost (HPB) configured battery charger such as charger 304 can separate the system power rail and the battery. In some embodiments, the system power rail is connected to the power input via switches 312 and 316.

In some embodiments, system load 310 is a mobile computing system, such as, for example, a smartphone, tablet, laptop computer, etc., among others. System load 310 can include a processor, a memory, one or more communication devices, etc., as well as other computing device components that make up the rest of the platform and are powered by rechargeable battery 306 and can also be powered from an external power source (not shown in FIG. 3). In some embodiments, battery 306 can provide power to system load 310 when an external power source is not available. In some embodiments, battery 306 is a lithium-ion battery pack. In some embodiments, other rechargeable or non-rechargeable batteries may be used.

In some embodiments, energy storage 308 can supplement the voltage provided by battery 306 to system load 310. For example, energy storage 308 can include one or more components for input decoupling of the charger 304 in the form of one or more capacitors coupled together (for example, in series). For example, energy storage 308 can be implemented by one or more individual capacitors coupled together in parallel or in series.

In some embodiments, energy storage 308 can supplement power to system load 310 to maintain the voltage being supplied to system load 310 above the minimum voltage level. This may occur when the voltage provided by battery 306 droops below a predetermined voltage level. The predetermined voltage level may be a threshold voltage level that is set above the minimum voltage level of the system. In such a case, when the voltage droops below the threshold voltage level, energy storage 308 can be used by the charger 304 to generate the power to supplement the power provided by battery 306 to the system load 310.

In some embodiments, monitoring hardware (not illustrated) monitors the voltage and/or power provided to system load 310 to determine if the voltage droops below the predetermined level (or the power goes above the battery capability, for example). In some embodiments, the voltage monitoring hardware monitors the voltage being supplied by battery 306 to system load 310 and energy storage 308. In some embodiments, the voltage monitoring hardware supplements the supply of power to system load 310 when the voltage supplied to system load 310, as monitored by voltage monitoring hardware, drops below a first threshold voltage level, which is above a minimum voltage level associated with the system load 310. In some embodiments, the voltage monitoring can be implemented by separate hardware coupled to the charger 304, the energy storage 308, and/or the system load 310. In some embodiments, the voltage monitoring can be implemented by charger controller that can also assert a signal when the voltage droops below a predetermined level. In some embodiments, the voltage monitoring can be implemented using controller 320.

In some embodiments, current or power may be monitored instead of voltage (for example, in order to determine if the voltage provided to system load 310 has dropped or may drop below the predetermined level).

In some embodiments, charger 304 can charge battery 306 and at times can charge energy storage 308 when an AC adapter is not present (for example, at the input port 302). In some embodiments, charger 304 can charge battery 306 and energy storage 308 when the voltage being supplied by battery 306 to system load 310 is above a second threshold level that is higher than another (for example, the first) threshold level that is used to trigger the usage of energy storage 308 to supplement power to system load 310. In such embodiments, charger 304 might not charge energy storage 308 when the voltage being supplied by battery 306 to system load 310 is below the second threshold level, but higher than the first threshold level. In some embodiments, the voltage monitoring hardware monitors the voltage being supplied by battery 306 to system load 310 to determine when charger 304 charges energy storage 308.

In some embodiments, charger 304 maintains a necessary amount of energy in energy storage 308, unless the SoC (or CPU) goes into a low power mode, and there is not possibility of the system load 310 to spike to a level sufficient to droop the system voltage below the minimum system requirements.

In some embodiments, switch 312 can be used to decouple input port 302 from the system (for example, from charger 304 and energy storage 308) when no device is connected to input port 302.

In some embodiments, energy storage 308 can be discharged to battery 306 when a power adapter is coupled to input port 302. In some embodiments, energy storage 308 can be discharged in response to a power adapter being connected to input port 302 but prior to the adapter providing power to system load 310 through input port 302.

In some embodiments, controller 320 is coupled to and controls components of the power delivery system to determine when energy source 308 is to supplement the power provided by batter 306 to system load 310, charge and discharge energy storage 308, as well as couple and decouple components of the system 300 at specific times. For example, in some embodiments, controller 320 can control one or more (or all) of switches 312, 314, and/or 316.

In some embodiments, switch 314 can include one or more pass FETs (or power FETs), and can be used to decouple battery 306 from system load 310. In some embodiments, for example, switch 314 can be used when an external power source (for example, a power adapter, and/or a Type C USB Power Delivery power supply) is coupled to input port 302 to provide power to system load 310.

In some embodiments, energy storage 308 (or a portion of energy storage 308) can be disconnected from the system with a switch in order to minimize leakage thereof or in order to avoid a necessity to fully discharge it when a device is connected at input port 302 and switch 312 is turned on.

In some embodiments, switch 316 can block energy storage 308 from the system load 310 (for example, when the system is in battery mode). In some embodiments, switch 316 can be used to separate the input decoupling from the system rail.

In some embodiments, Vmin active protection (for example, VAP, peak power protection, etc.) can be implemented in a hybrid power boost charging system. In some embodiments, switch 316 can be used to disconnect the system 300 from the input decoupling (for example, when using the system 300 and/or the charger 304 as a reverse boost converter). Use of switch 316 and/or control of switch 316 using a controller such as controller 320 allows use of Vmin active protection (for example, VAP, peak power protection, etc.) in a hybrid power boost system (hybrid power boost charger system or hybrid boost converter system).

In some embodiments, when an adapter is connected to input port 302, switch 312 is on, and the voltage of energy storage 308 is the same as the input voltage at input port 302. System load 310 can be directly connected to the input voltage, switch 314 can be off, and battery 306 can be charged at a separate voltage using hybrid power boost charger 304. When there is no adapter coupled to the input port 302, switch 312 can be turned off and switch 314 can be turned on so that the system load 310 is directly connected to the battery 306. In some embodiments, switch 316 can be turned off and energy storage 308 can be charged up to create an energy storage that can have the capability of smoothing out peaks of system power. That is, energy storage 308 could be used as a form of a battery, and the system can be supplemented during a peak power scenario. That is, the battery 306 can be supplemented by energy storage 308 when the battery nears a low voltage scenario that could cause system failure. For example, energy storage 308 could be charged up to 20V and the charger 304 can buck the voltage from 20V down to the voltage of the battery to supplement the battery 306. In this manner, input decoupling (for example, input decoupling using switch 316 and/or switch 312) may be used for energy storage using energy storage device 308.

Figure 4:
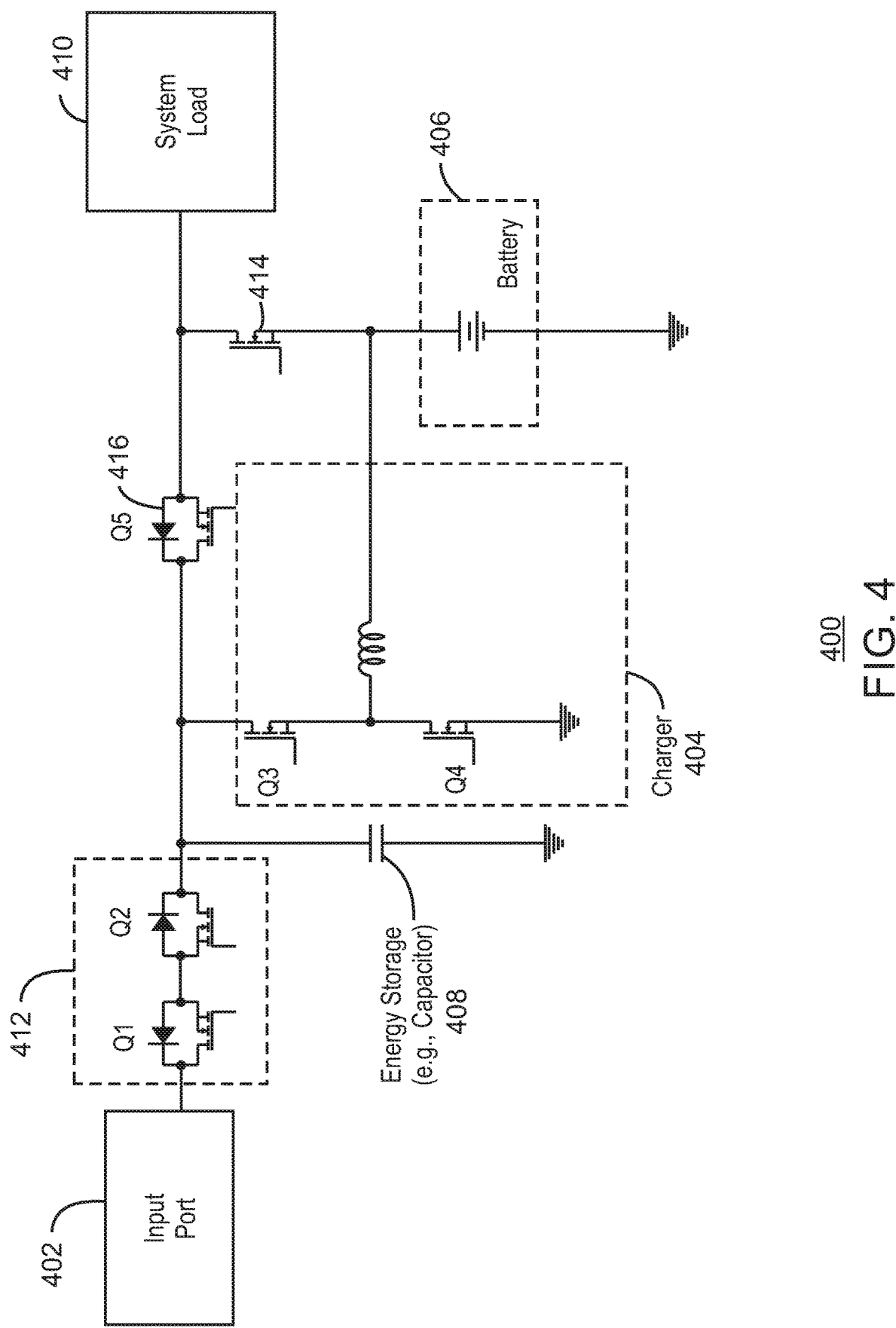
FIG. 4 illustrates a charging system.

FIG. 4 illustrates a system 400 in accordance with some embodiments. In some embodiments, system 400 can be the same as or similar to system 300. In some embodiments, system 400 is a power supply system (for example, a mobile power supply system). System 400 includes an input port 402 (for example, a USB type C connector, USB-C PD, and/or USB-C Thunderbolt enabled port), a charger 404 (for example, a Hybrid Power Boost charger or HPB charger, or a hybrid boost converter or HPB converter), a battery 406, an energy storage 408 (for example, a capacitor), a system load 410, a switch 412 (for example, using field effect transistors such as power FETs or pass FETs, Q1 and Q2), a switch 414 (for example, using a field effect transistor such as a power FET or pass FET), and a switch 416 (for example, using a field effect transistor such as a power FET or pass FET, Q5). In some embodiments, charger 404 can include two power field effect transistors (or pass FETs) Q3 and Q4 and an inductor. In some embodiments, although the FETs Q3 and Q4 within charger 404 and FET 414 are illustrated differently than FETs Q1 and Q2 of switch 212 and FET Q5 416, it is noted that in some embodiments, all FETs illustrated in FIG. 4 are the same. That is, in some embodiments all FETs in FIG. 4 can be illustrated as FETs Q1, Q2, and Q5 are illustrated, and in some embodiments, all FETs in FIG. 4 can be illustrated as FETs Q3, Q4, and FET 414 are illustrated.

In some embodiments, system 400 is a hybrid power boost (HPB) charging system, and charger 404 is an HPB charger. Charger 404 can provide power to system load 410, and can charge the battery 406 when an adapter is connected at the input port 402. As illustrated in FIG. 4, a hybrid power boost (HPB) configured battery charger such as charger 404 can separate the system power rail and the battery. In some embodiments, the system power rail is connected to the power input via switches 412 and 416.

In some embodiments, system load 410 is a mobile computing system, such as, for example, a smartphone, tablet, laptop computer, etc., among others. System load 410 can include a processor, a memory, one or more communication devices, etc., as well as other computing device components that make up the rest of the platform and are powered by rechargeable battery 406 and can also be powered from an external power source (not shown in FIG. 4). In some embodiments, battery 406 can provide power to system load 410 when an external power source is not available. In some embodiments, battery 406 is a lithium-ion battery pack. In some embodiments, other rechargeable or non-rechargeable batteries may be used.

In some embodiments, energy storage 408 can supplement the voltage provided by battery 406 to system load 410. For example, energy storage 408 can include one or more components for input decoupling of the charger 404 in the form of one or more capacitors coupled together (for example, in series). For example, energy storage 408 can be implemented by one or more individual capacitors coupled together in parallel or in series.

In some embodiments, energy storage 408 can supplement power to system load 410 to maintain the voltage being supplied to system load 410 above the minimum voltage level. This may occur when the voltage provided by battery 406 droops below a predetermined voltage level. The predetermined voltage level may be a threshold voltage level that is set above the minimum voltage level of the system. In such a case, when the voltage droops below the threshold voltage level, energy storage 408 can be used by the charger 404 to generate the power to supplement the power provided by battery 406 to the system load 410.

In some embodiments, monitoring hardware (not illustrated) monitors the voltage and/or power provided to system load 410 to determine if the voltage droops below the predetermined level (or the power goes above the battery capability, for example). In some embodiments, the voltage monitoring hardware monitors the voltage being supplied by battery 406 to system load 410 and energy storage 408. In some embodiments, the voltage monitoring hardware supplements the supply of power to system load 410 when the voltage supplied to system load 410, as monitored by voltage monitoring hardware, drops below a first threshold voltage level, which is above a minimum voltage level associated with the system load 410. In some embodiments, the voltage monitoring can be implemented by separate hardware coupled to the charger 404, the energy storage 408, and/or the system load 410. In some embodiments, the voltage monitoring can be implemented by charger controller that can also assert a signal when the voltage droops below a predetermined level. In some embodiments, the voltage monitoring can be implemented using a controller (not illustrated in FIG. 4, but in some embodiments can be a controller such as controller 320 of FIG. 3).

In some embodiments, current or power may be monitored instead of voltage (for example, in order to determine if the voltage provided to system load 410 has dropped or may drop below the predetermined level).

In some embodiments, charger 404 can charge battery 406 and at times can charge energy storage 408 when an AC adapter is not present (for example, at the input port 402). In some embodiments, charger 404 can charge battery 406 and energy storage 408 when the voltage being supplied by battery 406 to system load 410 is above a second threshold level that is higher than another (for example, the first) threshold level that is used to trigger the usage of energy storage 408 to supplement power to system load 410. In such embodiments, charger 404 might not charge energy storage 408 when the voltage being supplied by battery 406 to system load 410 is below the second threshold level, but higher than the first threshold level. In some embodiments, the voltage monitoring hardware monitors the voltage being supplied by battery 406 to system load 410 to determine when charger 404 charges energy storage 408.

In some embodiments, charger 404 maintains a necessary amount of energy in energy storage 408, unless the SoC (or CPU) goes into a low power mode, and there is not possibility of the system load 410 to spike to a level sufficient to droop the system voltage below the minimum system requirements.

In some embodiments, switch 412 can be used to decouple input port 402 from the system (for example, from charger 404 and energy storage 408) when no device is connected to input port 402.

In some embodiments, energy storage 408 can be discharged to battery 406 when a power adapter is coupled to input port 402. In some embodiments, energy storage 408 can be discharged in response to a power adapter being connected to input port 402 but prior to the adapter providing power to system load 410 through input port 402.

In some embodiments, a controller (for example, a controller such as controller 320 of FIG. 3) is coupled to and controls components of the power delivery system to determine when energy source 408 is to supplement the power provided by batter 406 to system load 410, charge and discharge energy storage 408, as well as couple and decouple components of the system 400 at specific times. For example, in some embodiments, the controller can control one or more (or all) of switches 412, 414, and/or 416.

In some embodiments, switch 414 can include one or more pass FETs (or power FETs), and can be used to decouple battery 406 from system load 410. In some embodiments, for example, switch 414 can be used when an external power source (for example, a power adapter, and/or a Type C USB Power Delivery power supply) is coupled to input port 402 to provide power to system load 410.

In some embodiments, energy storage 408 (or a portion of energy storage 408) can be disconnected from the system with a switch in order to minimize leakage thereof or in order to avoid a necessity to fully discharge it when a device is connected at input port 402 and switch 412 is turned on.

In some embodiments, switch 416 can block energy storage 408 from the system load 410 (for example, when the system is in battery mode). In some embodiments, switch 416 can be used to separate the input decoupling from the system rail.

In some embodiments, Vmin active protection (for example, VAP, peak power protection, etc.) can be implemented in a hybrid power boost charging system. In some embodiments, FET Q5 416 can be used to disconnect the system 400 from the input decoupling (for example, when using the system 400 and/or the charger 404 as a reverse boost converter). Use of FET Q5 416 and/or control of switch 416 using a controller such as controller 320 allows use of Vmin active protection (for example, VAP, peak power protection, etc.) in a hybrid power boost system (hybrid power boost charger system or hybrid boost converter system).

In some embodiments, when an adapter is connected to input port 402, FETs Q1 and Q2 of switch 412 are on, and the voltage of energy storage 408 is the same as the input voltage at input port 402. System load 410 can be directly connected to the input voltage, FET 414 can be off, and battery 406 can be charged at a separate voltage using hybrid power boost charger 404. When there is no adapter coupled to the input port 402, FETs Q1 and Q2 can be turned off and FET 414 can be turned on so that the system load 410 is directly connected to the battery 406. In some embodiments, FET Q5 416 can be turned off and energy storage 408 can be charged up to create an energy storage that can have the capability of smoothing out peaks of system power. That is, energy storage 408 could be used as a form of a battery, and the system can be supplemented during a peak power scenario. That is, the battery 406 can be supplemented by energy storage 408 when the battery nears a low voltage scenario that could cause system failure. For example, energy storage 408 could be charged up to 20V and the charger 404 can buck the voltage from 20V down to the voltage of the battery to supplement the battery 406. In this manner, input decoupling (for example, input decoupling using FET Q5 416 and/or switch 412) may be used for energy storage using energy storage device 408.

Figure 5:
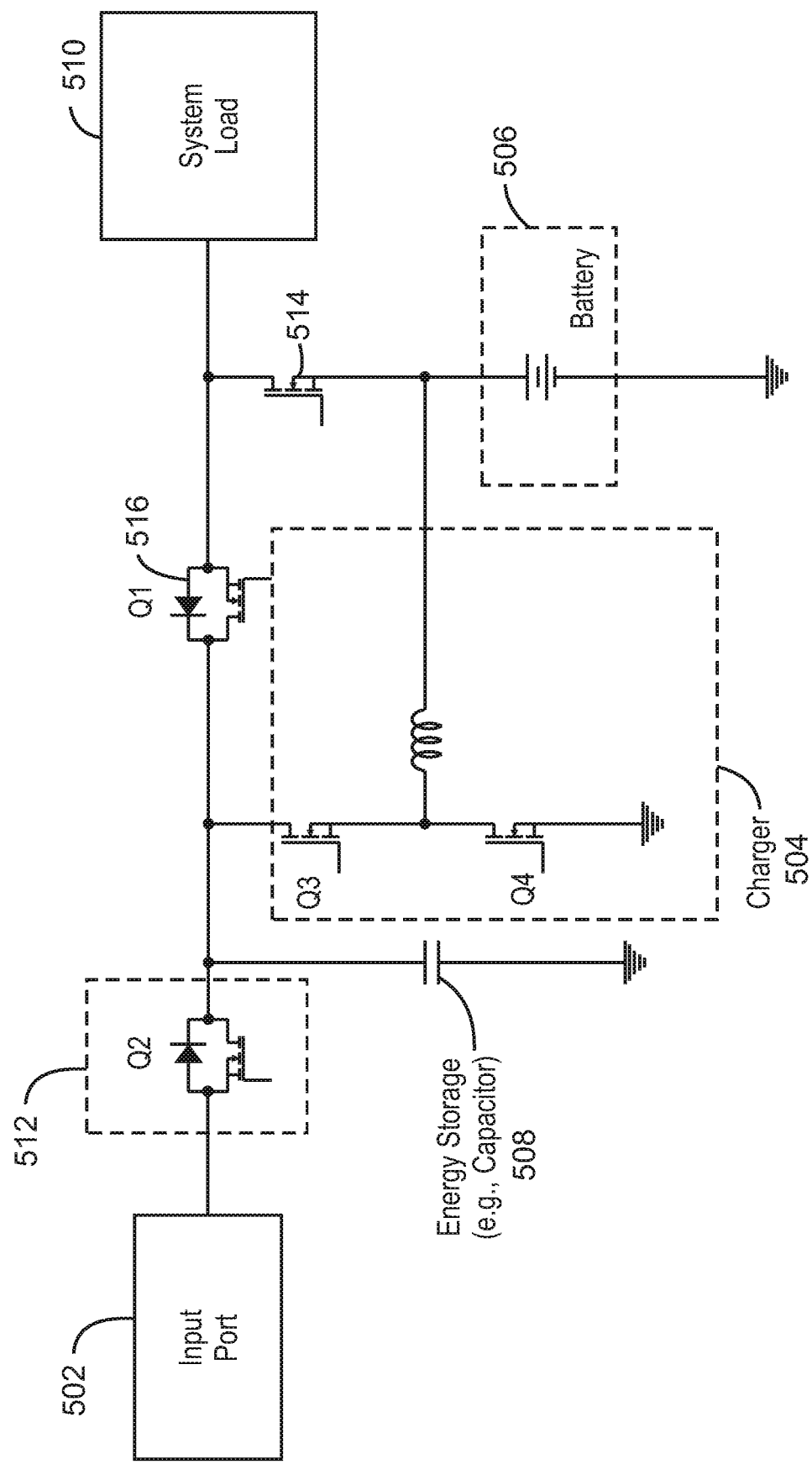
FIG. 5 illustrates a charging system.

FIG. 5 illustrates a system 500 in accordance with some embodiments. In some embodiments, system 500 can be the same as or similar to system 300. In some embodiments, system 500 can be similar to system 400. In some embodiments, system 500 is a power supply system (for example, a mobile power supply system). System 500 includes an input port 502 (for example, a USB type C connector, USB-C PD, and/or USB-C Thunderbolt enabled port), a charger 504 (for example, a Hybrid Power Boost charger or HPB charger, or a hybrid boost converter or HPB converter), a battery 506, an energy storage 508 (for example, a capacitor), a system load 510, a switch 512 (for example, using pass field effect transistor, or power FET, Q2), a switch 514 (for example, using a field effect transistor such as a pass FET or power FET), and a switch 516 (for example, using a field effect transistor such as a pass FET or power FET, Q5). In some embodiments, charger 404 can include two power field effect transistors Q3 and Q4 (such as pass FETs or power FETs) and an inductor. In some embodiments, although the FETs Q3 and Q4 within charger 504 and FET 514 are illustrated differently than FET Q2 of switch 512 and FET Q1 516, it is noted that in some embodiments, all FETs illustrated in FIG. 5 are the same. That is, in some embodiments all FETs in FIG. 5 can be illustrated as FETs Q1 and Q2 are illustrated, and in some embodiments, all FETs in FIG. 5 can be illustrated as FETs Q3, Q4, and FET 514 are illustrated.

In some embodiments, system 500 is a hybrid power boost (HPB) charging system, and charger 504 is an HPB charger. Charger 504 can provide power to system load 510, and can charge the battery 506 when an adapter is connected at the input port 502. As illustrated in FIG. 5, a hybrid power boost (HPB) configured battery charger such as charger 504 can separate the system power rail and the battery. In some embodiments, the system power rail is connected to the power input via switches 512 and 516.

In some embodiments, system load 510 is a mobile computing system, such as, for example, a smartphone, tablet, laptop computer, etc., among others. System load 510 can include a processor, a memory, one or more communication devices, etc., as well as other computing device components that make up the rest of the platform and are powered by rechargeable battery 506 and can also be powered from an external power source (not shown in FIG. 5). In some embodiments, battery 506 can provide power to system load 510 when an external power source is not available. In some embodiments, battery 506 is a lithium-ion battery pack. In some embodiments, other rechargeable or non-rechargeable batteries may be used.

In some embodiments, energy storage 508 can supplement the voltage provided by battery 506 to system load 510. For example, energy storage 508 can include one or more components for input decoupling of the charger 504 in the form of one or more capacitors coupled together (for example, in series). For example, energy storage 508 can be implemented by one or more individual capacitors coupled together in parallel or in series.

In some embodiments, energy storage 508 can supplement power to system load 510 to maintain the voltage being supplied to system load 510 above the minimum voltage level. This may occur when the voltage provided by battery 506 droops below a predetermined voltage level. The predetermined voltage level may be a threshold voltage level that is set above the minimum voltage level of the system. In such a case, when the voltage droops below the threshold voltage level, energy storage 508 can be used by the charger 504 to generate the power to supplement the power provided by battery 506 to the system load 510.

In some embodiments, monitoring hardware (not illustrated) monitors the voltage and/or power provided to system load 510 to determine if the voltage droops below the predetermined level (or the power goes above the battery capability, for example). In some embodiments, the voltage monitoring hardware monitors the voltage being supplied by battery 506 to system load 510 and energy storage 508. In some embodiments, the voltage monitoring hardware supplements the supply of power to system load 510 when the voltage supplied to system load 510, as monitored by voltage monitoring hardware, drops below a first threshold voltage level, which is above a minimum voltage level associated with the system load 510. In some embodiments, the voltage monitoring can be implemented by separate hardware coupled to the charger 504, the energy storage 508, and/or the system load 510. In some embodiments, the voltage monitoring can be implemented by charger controller that can also assert a signal when the voltage droops below a predetermined level. In some embodiments, the voltage monitoring can be implemented using a controller (not illustrated in FIG. 5, but in some embodiments can be a controller such as controller 320 of FIG. 3).

In some embodiments, current or power may be monitored instead of voltage (for example, in order to determine if the voltage provided to system load 510 has dropped or may drop below the predetermined level).

In some embodiments, charger 504 can charge battery 506 and at times can charge energy storage 508 when an AC adapter is not present (for example, at the input port 502). In some embodiments, charger 504 can charge battery 506 and energy storage 508 when the voltage being supplied by battery 506 to system load 510 is above a second threshold level that is higher than another (for example, the first) threshold level that is used to trigger the usage of energy storage 508 to supplement power to system load 510. In such embodiments, charger 504 might not charge energy storage 508 when the voltage being supplied by battery 506 to system load 510 is below the second threshold level, but higher than the first threshold level. In some embodiments, the voltage monitoring hardware monitors the voltage being supplied by battery 506 to system load 510 to determine when charger 504 charges energy storage 508.

In some embodiments, charger 504 maintains a necessary amount of energy in energy storage 508, unless the SoC (or CPU) goes into a low power mode, and there is not possibility of the system load 510 to spike to a level sufficient to droop the system voltage below the minimum system requirements.

In some embodiments, switch 512 can be used to decouple input port 502 from the system (for example, from charger 504 and energy storage 508) when no device is connected to input port 502.

In some embodiments, energy storage 508 can be discharged to battery 506 when a power adapter is coupled to input port 502. In some embodiments, energy storage 508 can be discharged in response to a power adapter being connected to input port 502 but prior to the adapter providing power to system load 510 through input port 502.

In some embodiments, a controller (for example, a controller such as controller 320 of FIG. 3) is coupled to and controls components of the power delivery system to determine when energy source 508 is to supplement the power provided by batter 506 to system load 510, charge and discharge energy storage 508, as well as couple and decouple components of the system 500 at specific times. For example, in some embodiments, the controller can control one or more (or all) of switches 512, 514, and/or 516.

In some embodiments, switch 514 can include one or more pass FETs (or power FETs), and can be used to decouple battery 506 from system load 510. In some embodiments, for example, switch 514 can be used when an external power source (for example, a power adapter, and/or a Type C USB Power Delivery power supply) is coupled to input port 502 to provide power to system load 510.

In some embodiments, energy storage 508 (or a portion of energy storage 508) can be disconnected from the system with a switch in order to minimize leakage thereof or in order to avoid a necessity to fully discharge it when a device is connected at input port 502 and switch 512 is turned on.

In some embodiments, Vmin active protection (for example, VAP, peak power protection, etc.) can be implemented in a hybrid power boost charging system. In some embodiments, FET Q1 516 can be used to disconnect the system 500 from the input decoupling (for example, when using the system 500 and/or the charger 504 as a reverse boost converter). Use of FET Q1 516 and/or control of switch 516 using a controller such as controller 320 allows use of Vmin active protection (for example, VAP, peak power protection, etc.) in a hybrid power boost system (hybrid power boost charger system or hybrid boost converter system).

In some embodiments, switch 516 can block energy storage 508 from the system load 510 (for example, when the system is in battery mode). In some embodiments, switch 516 can be used to separate the input decoupling from the system rail. In some embodiments, system 500 is cost and area effective relative to system 400, since it requires one less FET (power FET or pass FET, for example). In some embodiments, switch 512 includes one FET Q2 and switch 516 includes one FET Q1. FET Q1 can block energy storage 508 from the system load 510 when in battery mode.

In some embodiments, when an adapter is connected to input port 502, FET Q2 of switch 512 is on, and the voltage of energy storage 508 is the same as the input voltage at input port 502. System load 510 can be directly connected to the input voltage, FET 514 can be off, and battery 506 can be charged at a separate voltage using hybrid power boost charger 504. When there is no adapter coupled to the input port 502, FET Q2 can be turned off and FET 514 can be turned on so that the system load 510 is directly connected to the battery 506. In some embodiments, FET Q1 516 can be turned off and energy storage 508 can be charged up to create an energy storage that can have the capability of smoothing out peaks of system power. That is, energy storage 508 could be used as a form of a battery, and the system can be supplemented during a peak power scenario. That is, the battery 506 can be supplemented by energy storage 508 when the battery nears a low voltage scenario that could cause system failure. For example, energy storage 508 could be charged up to 20V and the charger 504 can buck the voltage from 20V down to the voltage of the battery to supplement the battery 506. In this manner, input decoupling (for example, input decoupling using FET Q1 516 and/or switch 512) may be used for energy storage using energy storage device 508.

In some embodiments (for example, in system 300, system 400, and system 500) the input decoupling is separated from the system rail. This can allow the input decoupling to store energy for a potential peak power situation that causes the voltage of the system rail to droop below the minimum voltage rating of the VRs or PMIC, and can allow for very high peak power.

In some embodiments, a hybrid power boost (HPB) configured battery charger can be implemented with peak power protection (for example, with Vmin active protection or VAP). In HPB battery charger configurations (such as, for example, system 200, system 300, system 400, and/or system 500) the system power rail and battery can be separated. The system power rail can be directly connected to the power input (for example, with two switches for protection). In some embodiments (for example, in system 300, system 400, and/or system 500) the input decoupling is separated from the system rail.

In some embodiments, one or more of the chargers illustrated and/or described herein (for example, charger 304, charger 404, and/or charger 504) can include a mode such as a protection ready mode. In this mode, the charger (in some embodiments, with input from controller 320) charges the input capacitor (for example, charges energy storage 308, energy storage 408, and/or energy storage 508) when the system is in a high mode (for example, mode S0). In some embodiments, for example, the input capacitor (energy storage) may be charged to 20V when the system is in the high mode. This can help supplement battery power to the system load in the future. In some embodiments, the charger and/or controller also maintain the energy storage in a charged state, and compensates for potential leakage in the energy storage.

In some embodiments, one or more of the chargers illustrated and/or described herein (for example, charger 304, charger 404, and/or charger 504) can include a mode such as a protection mode. In this mode, the charger and/or controller and/or monitoring hardware detects a system voltage droop to a threshold voltage, and supplements the battery in order to keep the voltage from drooping below the minimum allowable level. In some embodiments, the charger starts operating and the charger and/or controller transmit the energy stored in the energy storage to the system load. In some embodiments, the protection mode of the charger is disabled when the CPU is in a low power mode (for example, in mode S0i3, or any of modes S3-S5).

In some embodiments, when an adapter or a sink device is connected to an input port such as a USB-C port, for example, the energy storage (for example, capacitor) may be discharged to the battery side, or may be slowly discharged to the input port (for example, USB type C port) through FETs (for example, through FETs Q1 and/or Q2 in FIGS. 4 and/or 5).

In some embodiments, chargers 204, 304, 404 and 504 can be hybrid power boost chargers (or hybrid power boost converters). For example, a switch such as switch 314 (for example, a field effect transistor such as FET 214, 414, 514) can be included between the hybrid power boost charger (and/or an inductor of the hybrid power boost charger) and the system load. In this manner, the system load (or the system rail) can be at a different voltage than the battery, and the battery need not always be connected to the system load. In some embodiments, by using switch 214, 314, 414, 514 (and/or controlling that switch using a controller such as controller 320 or using the hybrid power boost charger), charging can begin by charging the system before charging the battery. In some embodiments, by using switch 214, 314, 414, 514 (and/or controlling that switch using a controller such as controller 320 or using the hybrid power boost charger), charging can begin by charging the battery before charging the system.

In some embodiments, Vmin active protection (for example, VAP, peak power protection, etc.) can be implemented in a hybrid power boost charging system. In some embodiments, switch 316, switch 416 (FET Q5 416), or switch 516 (FET Q1 516) can be used to disconnect the system from the input decoupling (for example, when using the system and/or the charger as a reverse boost converter. Use (and/or control) of switch 316, 416, and/or 516 allows use of Vmin active protection (for example, VAP, peak power protection, etc.) in a hybrid power boost system (hybrid power boost charger system or hybrid boost converter system).

Figure 6:
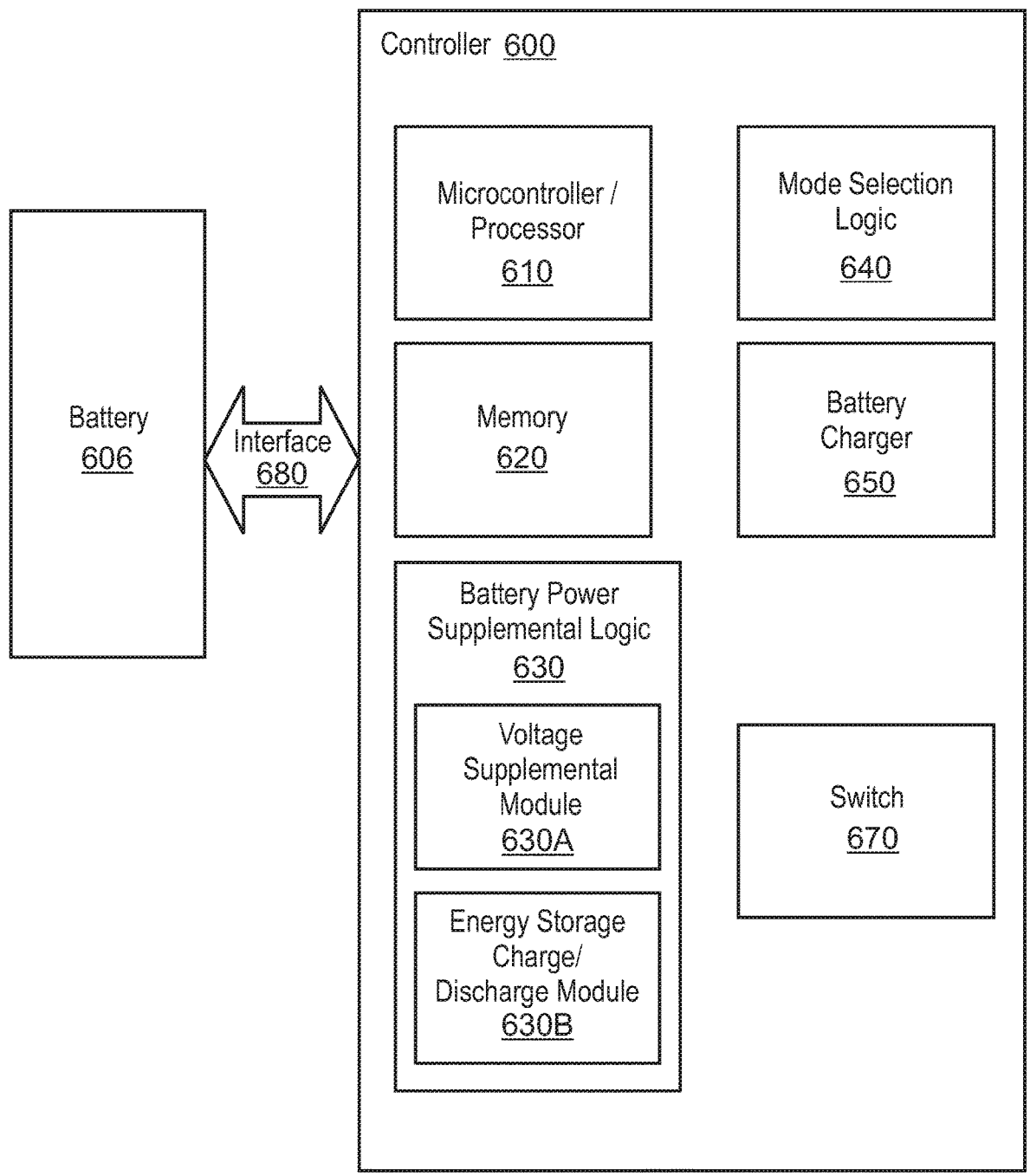
FIG. 6 illustrates a controller.

FIG. 6 illustrates a controller 600 in accordance with some embodiments. In some embodiments, controller 600 is the same as or similar to controller 320. In some embodiments, controller 600 is a battery controller. In some embodiments, controller 600 is one or more of an application specific integrated circuit (ASIC), a digital signal processor (DSP), a field programmable gate array (FPGA), a processor, etc. including some of all of the functional blocks in FIG. 6. In some embodiments, all or part of controller 600 is implemented in software as stored on a memory (for example, memory 420) and executed by, for example, a processor or microcontroller (for example, microcontroller/processor 610). In some embodiments, controller 600 can be, for example, a control IC. In some embodiments, controller 6909 can be part of a power management integrated circuit (PMIC). In some embodiments, controller 600 can be part of a fuel gauge. In some embodiments, controller 600 can be part of a battery management system.

Controller 600 interfaces with battery 606 using an interface 680. Interface 680 can include a physical interface for supplying power and ground. In some embodiments, interface 680 includes a data interface.

In some embodiments, controller 600 includes a processor or microcontroller 610, a memory 620, and battery power supplemental logic 630. In some embodiments, battery power supplemental logic 630 determines whether the power provided by the battery of the power supply system is to be supplemented or not from energy storage. In some embodiments, battery power supplemental logic 630 includes voltage supplemental module 630A that can determine whether to supplement the power provided by the battery based on, for example, the voltage currently being provided to the system load. This may be based on voltage monitoring hardware that provides voltage measurements to voltage supplemental module 430A. In some embodiments, if the voltage droops below a threshold, or other predetermined level, yet is above the voltage minimum of the system, then voltage supplemental module 430A can trigger and control the power supply system to have the power provided by the battery to be supplemented by power form the energy storage. This control may include turning on/off switches in the power delivery system (for example, switches 670, which may include any one or more of the switches of system 200, 300, 400, and/or 500, for example) to enable power to flow to the system load or to energy storage, and/or to protect other components in the system, to decouple the system load from the battery, etc.

In some embodiments, battery power supplemental logic 630 includes an energy storage charge and discharge module 630B that can control components in a hybrid power boost charging system such as, for example, system 200, 300, 400, and/or 500 to cause the energy storage to be charged at times and toe be discharged and/or disabled at other times.

Controller 600 can also include mode selection logic 640 that determines when to enter a particular mode, such as, for example, protection mode and protection ready mode as described herein. In some embodiments, mode selection logic 640 can trigger entry into the protection mode when the system voltage level droops below a predetermined threshold level. In some embodiments, mode selection logic 640 can trigger entry into protection ready mode to cause controller 600 to signal the battery charger to charge energy storage to prepare the power supply system for potential entry into protection mode in the future.

While not shown in FIG. 6, controller 600 can include analog-to-digital converters (ADCs), filters, and a digital amplifier. One or more of the ADCs, filters, and digital amplifier may be, for example, an ASIC, a DSP, an FPGA, a processor, etc. These elements may be used to convert and analog measurement (for example, battery current and voltage) to a digital value for use in the battery charging control process. The digital amplifier may be a differential amplifier that generates an analog signal based on the voltage drop across the battery (for example, the difference in voltage values between the positive and negative terminal of the battery), which is then converted to a filtered digital value using the ADC and the filter.

In some embodiments, controller 600 includes a battery charger 650 to charge the battery using current charge from a power supply.

In some embodiments, a critical voltage level of the system voltages when the protection is activated can be adjusted by the system Embedded Controller, the Fuel Gauge, or the SoC. The adjustment can be made based on the battery state of charge, peak power projections of the SoC or the rest of the platform, system impedance, or changes in system input decoupling, minimum system voltage, etc.

In some embodiments, controller 600 can implement any of the switch control or any other control described herein. For example, in some embodiments, controller 600 (and/or controller 320) can implement the flow 700 of FIG. 7.

Figure 7:
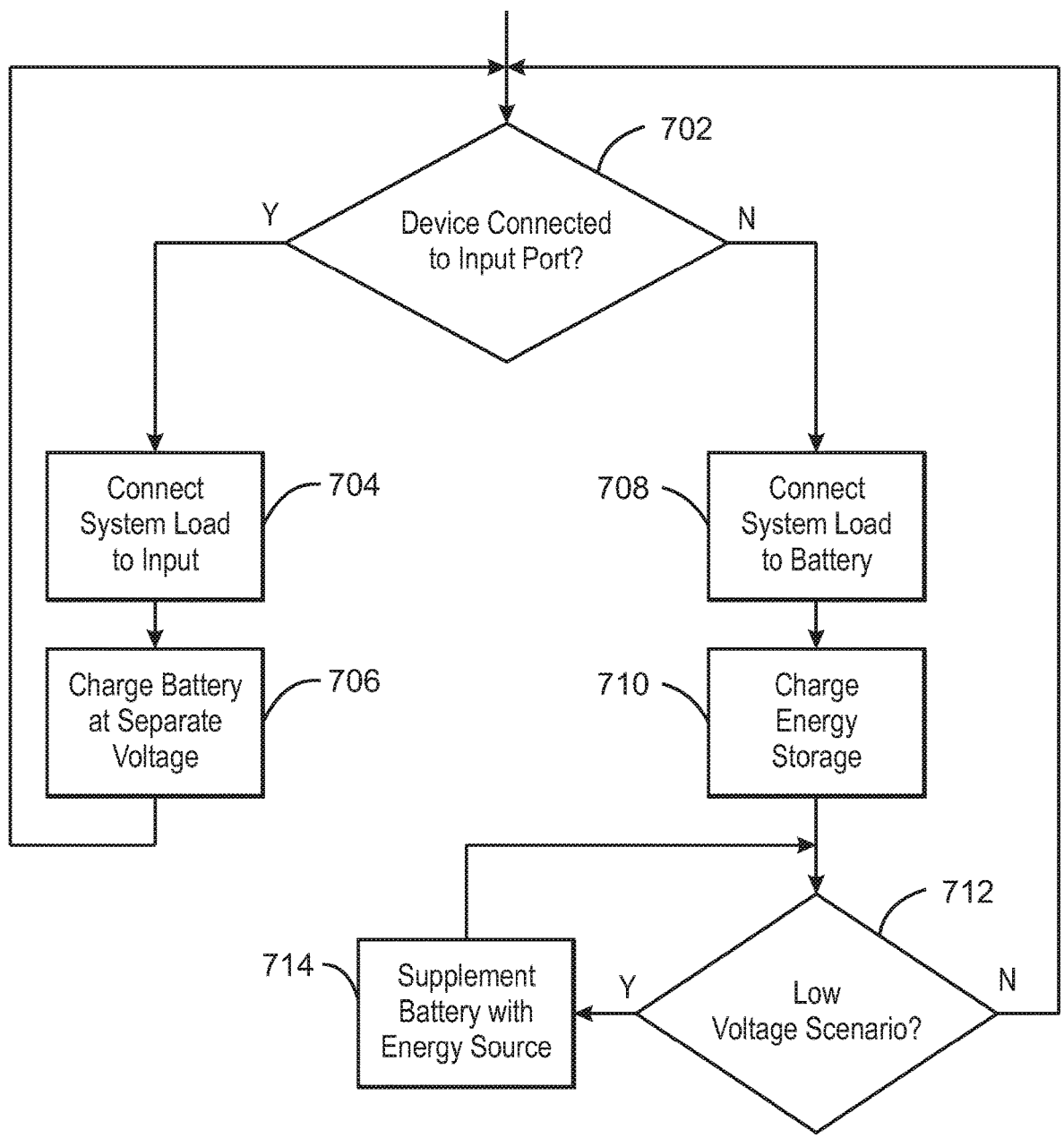
FIG. 7 illustrates a process flow.

FIG. 7 illustrates a flow 700 in accordance with some embodiments. In some embodiments, flow 700 is a flow for a hybrid boost charging system with peak power protection. A decision is made at 702 as to whether a device is connected to an input port of the system. If a device is connected, a system load is connected to the input at 704 (for example, using switches and/or FETs and/or control thereof as illustrated and described herein). Then the battery is charged at a voltage that is separate from the input voltage at 706, and flow returns to 702. If a device is not connect to the input port at 702, the system load is connected to a battery at 708 (for example, using switches and/or FETs and/or control thereof as illustrated and described herein). An energy storage is then charged at 710. At 712, a determination is made as to whether a low voltage scenario is occurring (or about to occur). If there is not a low voltage scenario at 712, flow returns to 702. If there is a low voltage scenario at 712, the battery is supplemented with the charged energy source (energy storage) at 714 until the low voltage scenario no longer exists. Flow 700 shows one embodiment, and many other embodiments include similar and/or different flow.

Figure 8:
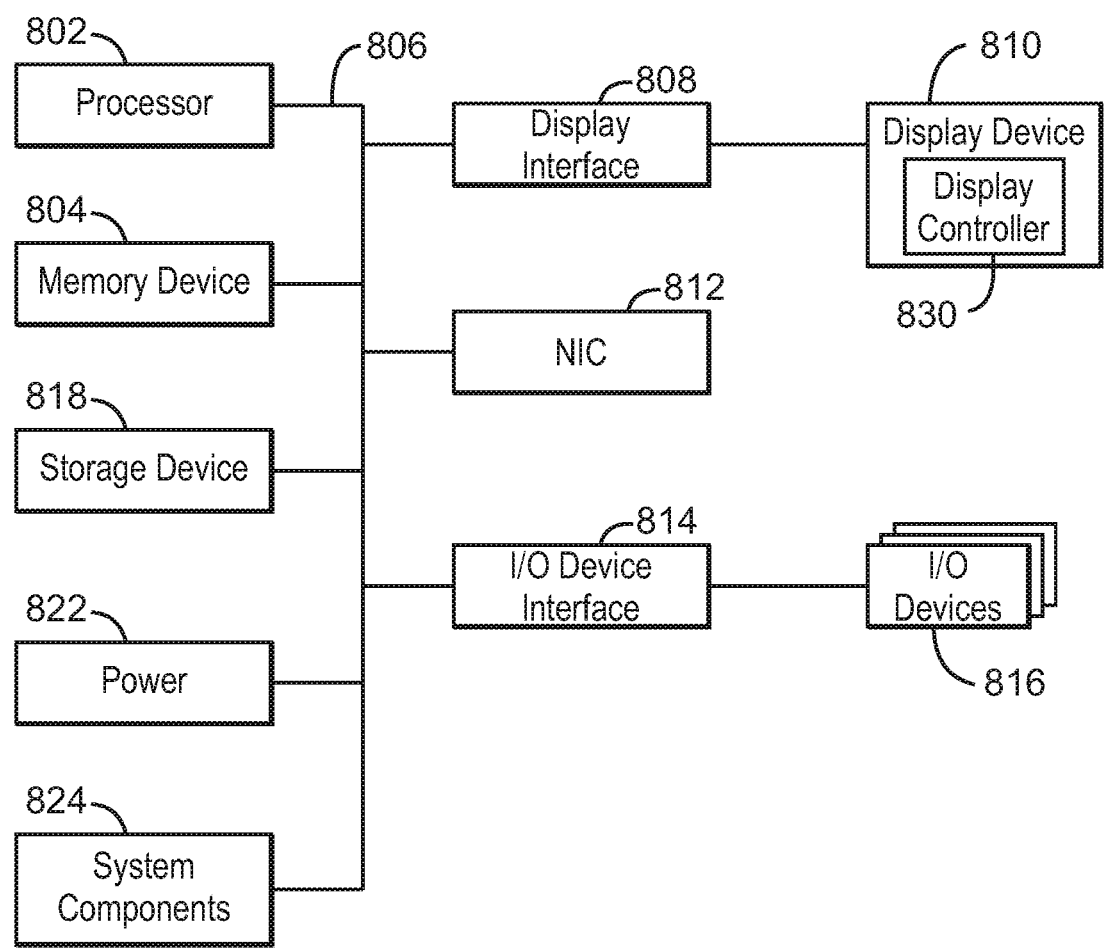
FIG. 8 illustrates a computing system.

FIG. 8 is a block diagram of an example of a computing device 700 that can include, for example, hybrid power boost, peak power protection, and/or any other techniques described and/or illustrated herein, etc., according to some embodiments. In some embodiments, any portion of the circuits or systems illustrated in any one or more of the figures, and any of the embodiments described herein can be included in or be implemented by computing device 800. The computing device 800 may be, for example, a computing device, a portable device, a wearable device, an internet of things (IoT) device, a mobile phone, mobile device, handset, laptop computer, desktop computer, or tablet computer, among others. The computing device 800 may include a processor 802 that is adapted to execute stored instructions, as well as a memory device 804 (or storage device 804) that stores instructions that are executable by the processor 802. The processor 802 can be a single core processor, a multi-core processor, a computing cluster, or any number of other configurations. For example, processor 802 can be an Intel® processor such as an Intel® Celeron, Pentium, Core, Core i3, Core i5, or Core i7 processor. In some embodiments, processor 802 can be an Intel® x86 based processor. In some embodiments, processor 802 can be an ARM based processor. The memory device 804 can be a memory device or a storage device, and can include volatile storage, non-volatile storage, random access memory, read only memory, flash memory, or any other suitable memory or storage systems. The instructions that are executed by the processor 702 may also be used to implement hybrid power boost charging and/or conversion, peak power management, peak power protection, etc. as described in this specification. In some embodiments, processor 802 may include the same or similar features or functionality as, for example, various controllers in this disclosure (for example controller 320 or controller 600).

The processor 802 may also be linked through the system interconnect 806 (e.g., PCI®, PCI-Express®, NuBus, etc.) to a display interface 808 adapted to connect the computing device 800 to a display device 810. The display device 810 may include a display controller 830. Display device 810 may also include a display screen that is a built-in component of the computing device 800. The display device may also include a computer monitor, television, or projector, among others, that is externally connected to the computing device 800. In some embodiments, computing device 800 does not include a display interface or a display device.

In some embodiments, the display interface 808 can include any suitable graphics processing unit, transmitter, port, physical interconnect, and the like. In some examples, the display interface 808 can implement any suitable protocol for transmitting data to the display device 810. For example, the display interface 808 can transmit data using a high-definition multimedia interface (HDMI) protocol, a DisplayPort protocol, or some other protocol or communication link, and the like In addition, a network interface controller (also referred to herein as a NIC) 812 may be adapted to connect the computing device 800 through the system interconnect 806 to a network (not depicted). The network (not depicted) may be a cellular network, a radio network, a wide area network (WAN), a local area network (LAN), or the Internet, among others.

The processor 802 may be connected through system interconnect 806 to an input/output (I/O) device interface 814 adapted to connect the computing host device 800 to one or more I/O devices 816. The I/O devices 816 may include, for example, a keyboard or a pointing device, where the pointing device may include a touchpad or a touchscreen, among others. The I/O devices 816 may be built-in components of the computing device 800, or may be devices that are externally connected to the computing device 800.

In some embodiments, the processor 802 may also be linked through the system interconnect 806 to a storage device 818 that can include a hard drive, a solid-state drive (SSD), a magnetic drive, an optical drive, a USB flash drive, an array of drives, or any other type of storage, including combinations thereof. In some embodiments, the storage device 818 can include any suitable applications that can be used by processor 802 to implement any of the techniques described herein. In some embodiments, the storage device 818 can include a basic input/output system (BIOS).

In some embodiments, a power device 822 is provided. For example, in some embodiments, power device 822 can provide charging, power, power supply, power delivery, power management, peak power management, under-voltage protection, power control, voltage regulation, power generation, voltage generation, power protection, or voltage protection, etc. Power 822 can include any of the hybrid power boost charging systems described herein. In some embodiments, power 822 can be a part of system 800, and in some embodiments, power 822 can be external to the rest of system 800. In some embodiments, power 822 can provide any of charging, power, power supply, power delivery, power management, peak power management, under-voltage protection, power control, voltage regulation, power generation, voltage generation, power protection, or voltage protection, or any other techniques such as those described herein. For example, in some embodiments, power 822 can provide hybrid power boost and/or peak power management, etc. as described in reference to or illustrated in any of the drawings herein.

FIG. 8 also illustrates system components 824. In some embodiments, system components 824 can include any of display, camera, audio, storage, modem, or memory components, or any additional system components. In some embodiments, system components 824 can include any system components for which power, voltage, power management, etc. can be implemented according to some embodiments as described herein.

It is to be understood that the block diagram of FIG. 8 is not intended to indicate that the computing device 800 is to include all of the components shown in FIG. 8 in all embodiments. Rather, the computing device 800 can include fewer or additional components not illustrated in FIG. 8 (e.g., additional memory components, embedded controllers, additional modules, additional network interfaces, etc.). Furthermore, any of the functionalities of power device 822 may be partially, or entirely, implemented in hardware or in a processor such as processor 802. For example, the functionality may be implemented with an application specific integrated circuit, logic implemented in an embedded controller, or in logic implemented in the processor 802, among others. In some embodiments, the functionalities of power device 822 can be implemented with logic, wherein the logic, as referred to herein, can include any suitable hardware (e.g., a processor, among others), software (e.g., an application, among others), firmware, or any suitable combination of hardware, software, or firmware. In some embodiments, power device 822 can be implemented with an integrated circuit.

Figure 9:
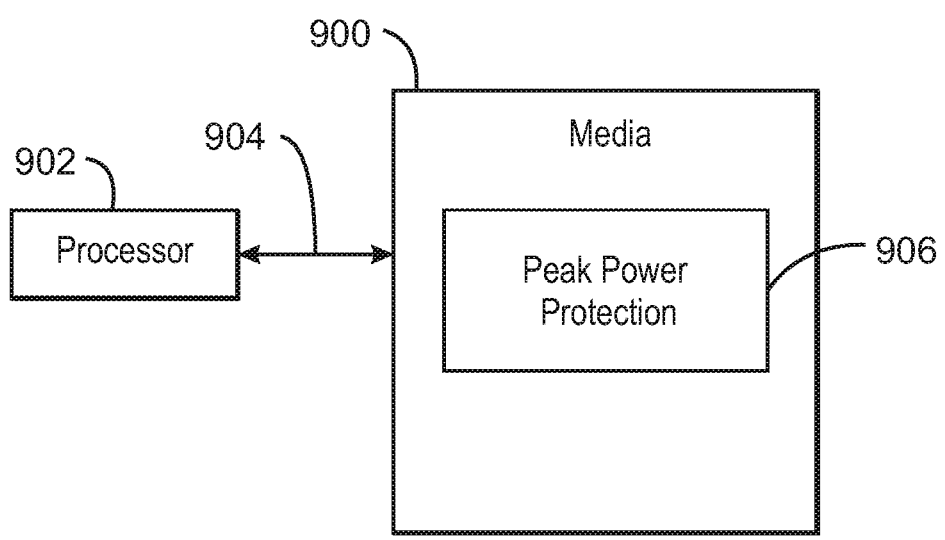
FIG. 9 illustrates one or more processors and one or more media.

FIG. 9 is a block diagram of an example of one or more processors 902 and one or more tangible, non-transitory computer readable media 900 for hybrid power boost and peak power management, etc. The one or more tangible, non-transitory, computer-readable media 900 may be accessed by the processor(s) 902 over a computer interconnect 904. Furthermore, the one or more tangible, non-transitory, computer-readable media 900 may include code to direct the processor(s) 902 to perform operations as described herein. In some embodiments, processor 902 is one or more processors. In some embodiments, processor(s) 902 can perform some or all of the same or similar functions that can be performed by other elements described herein using instructions (code) included on media 900 (for example, some or all of the functions illustrated in or described in reference to any of FIGS. 1-8). In some embodiments, one or more of processor(s) 902 may include the same or similar features or functionality as, for example, various controllers in this disclosure (for example controller 320, controller 600, etc.)

Various components discussed in this specification may be implemented using software components. These software components may be stored on the one or more tangible, non-transitory, computer-readable media 900, as indicated in FIG. 9. For example, hybrid power boost, power management, peak power management, under-voltage protection, power generation, voltage generation, power protection, or voltage protection, etc. may be adapted to direct the processor(s) 902 to perform one or more of any of the operations described in this specification and/or in reference to the drawings. For example, in some embodiments, one or more media 900 include(s) peak power protection 906 (for example, hybrid power boost peak power protection).

It is to be understood that any suitable number of software components may be included within the one or more tangible, non-transitory computer-readable media 900. Furthermore, any number of additional software components shown or not shown in FIG. 9 may be included within the one or more tangible, non-transitory, computer-readable media 900, depending on the specific application.

This specification refers to a system and a platform. For example, in some places, this specification refers to platform power and in some places this specification refers to system power. It is noted that where system is included it is also contemplated that platform could be included in the same manner. It is also noted that were platform is included it is also contemplated that system could be included in the same manner. For example, if system power (or system voltage) is mentioned, that reference can also apply to platform power (or platform voltage). Similarly, if platform power (or platform voltage) is mentioned, that reference can also apply to system power (or system voltage).

Reference in the specification to "one embodiment" or "an embodiment" or "some embodiments" of the disclosed subject matter means that a particular feature, structure, or characteristic described in connection with the embodiment is included in at least one embodiment of the disclosed subject matter. Thus, the phrase "in one embodiment" or "in some embodiments" may appear in various places throughout the specification, but the phrase may not necessarily refer to the same embodiment or embodiments.

EXAMPLE 1 In some examples, a hybrid power boost peak power protection system includes an energy storage, a hybrid power boost charger to charge a battery, and a switch to couple a system load to the energy storage and to decouple the system load from the energy storage.

Example 2 includes the subject matter of example 1. In example 2, a second switch is to couple the battery to the system load and is to decouple the battery from the system load.

Example 3 includes the subject matter of any of examples 1-2. In example 3, a controller is to control the switch.

Example 4 includes the subject matter of any of examples 1-3. In example 4, when a device is coupled to an input port of the system the switch is on to connect the system load to an input voltage.

Example 5 includes the subject matter of any of examples 1-4. In example 5, the battery and the system load are decoupled using the second switch when a device is coupled to the input port.

Example 6 includes the subject matter of any of examples 1-5. In example 6, the battery can be charged by the hybrid power boost charger when the battery and the system load are decoupled using the second switch.

Example 7 includes the subject matter of any of examples 1-6. In example 7, the battery can be charged by the hybrid power boost charger at a voltage different than a voltage being provided to the system load when the battery and the system load are decoupled using the second switch.

Example 8 includes the subject matter of any of examples 1-7. In example 8, an input port is decoupled and the second switch couples the system load to the battery when no device is coupled to the input port.

Example 9 includes the subject matter of any of examples 1-8. In example 9, the switch is turned off and the energy storage is charged when no device is coupled to an input port of the system.

Example 10 includes the subject matter of any of examples 1-9. In example 10, the second switch is on, and the battery and the energy source provide power to the system load when a low voltage scenario exists.

Example 11 includes the subject matter of any of examples 1-10. In example 11, the switch includes a field effect transistor.

Example 12 includes the subject matter of any of examples 1-11. In example 12, the second switch includes a field effect transistor.

Example 13 includes one or more tangible, non-transitory machine readable media including a plurality of instructions that, in response to being executed on at least one processor, cause the at least one processor to charge a battery using hybrid power boost, and to couple a system load to an energy storage and decouple the system load from the energy storage.

Example 14 includes the subject matter of example 13. In example 14, the media includes a plurality of instructions that, in response to being executed on at least one processor, cause the at least one processor to couple the battery to the system load and decouple the battery from the system load.

Example 15 includes the subject matter of any of examples 13-14. In example 15, the media includes a plurality of instructions that, in response to being executed on at least one processor, cause the at least one processor to couple the system load to an input voltage when a device is coupled to an input port of the system.

Example 16 includes the subject matter of any of examples 13-15. In example 16, the media includes a plurality of instructions that, in response to being executed on at least one processor, cause the at least one processor to decouple the battery and the system load when a device is coupled to the input port.

Example 17 includes the subject matter of any of examples 13-16. In example 17, the media includes a plurality of instructions that, in response to being executed on at least one processor, cause the at least one processor to charge the battery using hybrid power boost when the battery and the system load are decoupled.

Example 18 includes the subject matter of any of examples 13-17. In example 18, the media includes a plurality of instructions that, in response to being executed on at least one processor, cause the at least one processor to decouple the input port and couple the system load to the battery when no device is coupled to an input port.

Example 19 includes the subject matter of any of examples 13-18. In example 19, the media includes a plurality of instructions that, in response to being executed on at least one processor, cause the at least one processor to charge the energy storage when no device is coupled to an input port of the system.

Example 20 includes the subject matter of any of examples 13-19. In example 20, the media includes a plurality of instructions that, in response to being executed on at least one processor, cause the at least one processor to provide power to the system load using the battery and the energy source when a low voltage scenario exists.

Example 21 includes a hybrid power boost peak protection method including charging a battery using hybrid power boost, coupling a system load to an energy storage, and decoupling the system load from the energy storage.

Example 22 includes the subject matter of example 21. In example 22, the method includes coupling the battery to the system load, and decoupling the battery from the system load.

Example 23 includes the subject matter of any of examples 21-22. In example 23, the method includes coupling the system load to an input voltage when a device is coupled to an input port of the system.

Example 24 includes the subject matter of any of examples 21-23. In example 24, the method includes decoupling the battery and the system load when a device is coupled to the input port.

Example 25 includes the subject matter of any of examples 21-24. In example 25, the method includes charging the battery using hybrid power boost when the battery and the system load are decoupled.

Example 26 includes the subject matter of any of examples 21-25. In example 26, the method includes decoupling the input port and coupling the system load to the battery when no device is coupled to an input port.

Example 27 includes the subject matter of any of examples 21-26. In example 27, the method includes charging the energy storage when no device is coupled to an input port of the system.

Example 28 includes the subject matter of any of examples 21-27. In example 28, the method includes providing power to the system load using the battery and the energy source when a low voltage scenario exists.

Example 29 includes an apparatus including means to perform a method as in any other example.

Example 30 includes machine-readable storage including machine-readable instructions, when executed, to implement a method or realize an apparatus as in any other example.

Although example embodiments and examples of the disclosed subject matter are described with reference to circuit diagrams, flow diagrams, block diagrams etc. in the drawings, persons of ordinary skill in the art will readily appreciate that many other ways of implementing the disclosed subject matter may alternatively be used. For example, the arrangements of the elements in the diagrams, or the order of execution of the blocks in the diagrams may be changed, or some of the circuit elements in circuit diagrams, and blocks in block/flow diagrams described may be changed, eliminated, or combined. Any elements as illustrated or described may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

Program code may represent hardware using a hardware description language or another functional description language which essentially provides a model of how designed hardware is expected to perform. Program code may be assembly or machine language or hardware-definition languages, or data that may be compiled or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, one or more volatile or non-volatile memory devices, such as storage devices or an associated machine readable or machine accessible medium including solid-state memory, harddrives, floppy-disks, optical storage, tapes, flash memory, memory sticks, digital video disks, digital versatile discs (DVDs), etc., as well as more exotic mediums such as machine-accessible biological state preserving storage. A machine readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile or non-volatile memory readable by the processor, at least one input device or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, or in a distributed environment, and with program code stored locally or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter. For example, in each illustrated embodiment and each described embodiment, it is to be understood that the diagrams of the figures and the description herein is not intended to indicate that the illustrated or described devices include all of the components shown in a particular figure or described in reference to a particular figure. In addition, each element may be implemented with logic, wherein the logic, as referred to herein, can include any suitable hardware (e.g., a processor, among others), software (e.g., an application, among others), firmware, or any suitable combination of hardware, software, and firmware, for example.

What is claimed is:

1. A hybrid power boost peak power protection system comprising:
   an input port;
   an energy storage;
   a hybrid power boost charger to charge a battery; and
   a switch to couple a system load to the energy storage and to decouple the system load from the energy storage; and
   a second switch to decouple the battery and the system load when a device is coupled to the input port.

2. The hybrid power boost peak power protection system of claim 1,
   the second switch to couple the battery to the system load and to decouple the battery from the system load.

3. The hybrid power boost peak power protection system of claim 1, comprising a controller to control the switch.

4. The hybrid power boost peak power protection system of claim 1, wherein the switch is on when a device is coupled to an input port of the system in a manner to connect the system load to an input voltage.

5. The hybrid power boost peak power protection system of claim 1, wherein the battery can be charged by the hybrid power boost charger when the battery and the system load are decoupled using the second switch.

6. The hybrid power boost peak power protection system of claim 5, wherein the battery can be charged by the hybrid power boost charger at a voltage different than a voltage being provided to the system load when the battery and the system load are decoupled using the second switch.

7. The hybrid power boost peak power protection system of claim 2, wherein the input port is decoupled and the second switch couples the system load to the battery when no device is coupled to the input port.

8. The hybrid power boost peak power protection system of claim 1, wherein the switch is turned off and the energy storage is charged when no device is coupled to the input port.

9. The hybrid power boost peak power protection system of claim 2, wherein the second switch is on, and the battery and the energy source provide power to the system load when a low voltage scenario exists.

10. The hybrid power boost peak power protection system of claim 1, wherein the switch includes a field effect transistor.

11. The hybrid power boost peak power protection system of claim 2, wherein the second switch includes a field effect transistor.

12. One or more tangible, non-transitory machine readable media comprising a plurality of instructions that, in response to being executed on at least one processor, cause the at least one processor to:
charge a battery using hybrid power boost; and
couple a system load to an energy storage and decouple the system load from the energy storage; and
decouple the battery and the system load when a device is coupled to an input port.

13. The one or more tangible, non-transitory machine readable media of claim 12, comprising a plurality of instructions that, in response to being executed on at least one processor, cause the at least one processor to:
couple the battery to the system load and decouple the battery from the system load.

14. The one or more tangible, non-transitory machine readable media of claim 12, comprising a plurality of instructions that, in response to being executed on at least one processor, cause the at least one processor to:
when a device is coupled to the input port, couple the system load to an input voltage.

15. The one or more tangible, non-transitory machine readable media of claim 11, comprising a plurality of instructions that, in response to being executed on at least one processor, cause the at least one processor to:
charge the battery using hybrid power boost when the battery and the system load are decoupled.

16. The one or more tangible, non-transitory machine readable media of claim 12, comprising a plurality of instructions that, in response to being executed on at least one processor, cause the at least one processor to:
when no device is coupled to the input port, decouple the input port and couple the system load to the battery.

17. The one or more tangible, non-transitory machine readable media of claim 12, comprising a plurality of instructions that, in response to being executed on at least one processor, cause the at least one processor to:
charge the energy storage when no device is coupled to the input port.

18. The one or more tangible, non-transitory machine readable media of claim 12, comprising a plurality of instructions that, in response to being executed on at least one processor, cause the at least one processor to:
provide power to the system load using the battery and the energy source when a low voltage scenario exists.

19. A hybrid power boost peak protection method comprising:
charging a battery using hybrid power boost;
coupling a system load to an energy storage; and
decoupling the system load from the energy storage; and
decoupling the battery and the system load when a device is coupled to an input port.

20. The hybrid power boost peak protection method of claim 19, comprising:
coupling the battery to the system load; and
decoupling the battery from the system load.

21. The hybrid power boost peak protection method of claim 19, comprising:
when a device is coupled to the input port, coupling the system load to an input voltage.

22. The hybrid power boost peak protection method of claim 19, comprising:
charging the battery using hybrid power boost when the battery and the system load are decoupled.

23. The hybrid power boost peak protection method of claim 19, comprising:
when no device is coupled to the input port, decoupling the input port and coupling the system load to the battery.

24. The hybrid power boost peak protection method of claim 19, comprising:
charging the energy storage when no device is coupled to the input port.

25. The hybrid power boost peak protection method of claim 19, comprising:
providing power to the system load using the battery and the energy source when a low voltage scenario exists.

26. The hybrid power boost peak power protection system of claim 1, wherein when the energy source is decoupled from the system load, the energy storage may be coupled to an input voltage to store energy to provide peak power.

27. The one or more tangible, non-transitory machine readable media of claim 12, comprising a plurality of instructions that, in response to being executed on at least one processor, cause the at least one processor to:
when the energy source is decoupled from the system load, couple the energy storage to an input voltage to store energy to provide peak power.

28. The hybrid power boost peak protection method of claim 19, comprising when the energy source is decoupled from the system load, coupling the energy storage to an input voltage to store energy to provide peak power.

29. The hybrid power boost peak power protection system of claim 1, wherein the switch is to decouple the energy storage from the system load when in a battery mode.

30. The one or more tangible, non-transitory machine readable media of claim 12, comprising a plurality of instructions that, in response to being executed on at least one processor, cause the at least one processor to:
decouple the energy storage from the system load when in a battery mode.

31. The hybrid power boost peak protection method of claim 19, comprising decoupling the energy storage from the system load when in a battery mode.

* * * * *